United States Patent [19]
Li et al.

[11] Patent Number: 5,688,614
[45] Date of Patent: Nov. 18, 1997

[54] ELECTROCHEMICAL CELL HAVING A POLYMER ELECTROLYTE

[75] Inventors: Changming Li, Vernon Hills; Ke Keryn Lian, Northbrook; Marc K. Chason, Schaumburg; Joseph G. Kincs, Arlington Heights; Gretchen E. Fougere, Glencoe, all of Ill.

[73] Assignee: Motorola, Inc., Schaumburg, Ill.

[21] Appl. No.: 641,716

[22] Filed: May 2, 1996

[51] Int. Cl.$^6$ .............................. H01M 6/18; H01G 9/025
[52] U.S. Cl. .......................... 429/192; 429/33; 252/62.2; 361/525
[58] Field of Search ................... 429/192, 33; 252/62.2; 361/523, 525, 529, 528, 532

[56] References Cited

U.S. PATENT DOCUMENTS

| | | | |
|---|---|---|---|
| 4,269,913 | 5/1981 | Lim et al. | 429/251 |
| 4,766,522 | 8/1988 | McHardy et al. | 361/501 |
| 5,437,942 | 8/1995 | Murata et al. | 429/192 |
| 5,521,023 | 5/1996 | Kejha et al. | 429/192 |

FOREIGN PATENT DOCUMENTS 78404  5/1983  European Pat. Off. .

OTHER PUBLICATIONS

Polybenzimidazoles, vol. 11, pp. 572–601, Encyclopedia of Polymer Science & Engineering, Wiley Interscience, ISBM 0-471-80944-6 (Date Unknown).

Publication entitled History and Development of Polybenzimidazole, Powers, et al, PBI Products Division, Hoechst Celanese; Symposium on the Istory of High Performance Polymers, ACS, Apr., 1986.

*Primary Examiner*—Alan Diamond
*Attorney, Agent, or Firm*—Kenneth M. Massaroni

[57] ABSTRACT

An electrochemical cell is provided with first and second electrodes, and a solid polymer electrolyte disposed therebetween. The electrodes may either be of the same or different materials and may be fabricated from ruthenium, iridium, cobalt, tungsten, vanadium, iron, molybdenum, halfnium, nickel, silver, zinc, and combinations thereof. The solid polymer electrolyte is in intimate contact with both the anode and the cathode, and is made from a polymeric support structure having dispersed therein an electrolyte active species. The polymer support structure is preferably a multi-layered support structure in which at least a first layer is fabricated of a polybenzimidazole, and at least a second layer is fabricated of, for example, poly vinyl alcohol.

43 Claims, 5 Drawing Sheets

ELECTROCHEMICAL CELL HAVING A POLYMER ELECTROLYTE

TECHNICAL FIELD

This invention relates in general to electrochemical cells, and more particularly to electrochemical cells having a polymer electrolyte comprising a polymeric matrix or support structure and an electrolyte active species dispersed therein.

BACKGROUND OF THE INVENTION

Energy generation and storage has long been a subject of study and development. Of special importance is the storage of electrical energy in a compact form that can be readily charged and discharged such as rechargeable electrochemical batteries and/or electrochemical capacitors. High power, high current pulse rechargeable electrochemical charge storage devices are also becoming increasingly important in applications in which electrical pulses are demanded of the battery cells. Examples of such devices include digital communication devices, power tools, and portable computers to name but a few. In each of these devices, high electrochemical kinetic rate, long cycle life of the electrode material and good ionic conductivity of the electrolyte are all extremely important considerations.

Most electrochemical cells have heretofore relied upon aqueous or liquid electrolytes to provide ionic conductivity between the electrodes thereof. Unfortunately, aqueous liquid electrolytes have problems associated with sealing, packaging, and electrolyte leakage, all of which are well known in the industry. Solid polymer electrolytes were developed by numerous different companies in an effort to address the problems associated with liquid aqueous electrolytes. Each of these different types of solid polymer electrolyte systems have met with varying degrees of success, typically owing to the fact that ionic conductivity is generally not as good as that found in a liquid aqueous system. Solid polymer electrolytes alleviate the problems experienced with respect to packaging and electrolyte leakage. In addition, polymer electrolytes have the additional advantage of being able to be formed into thin films to improve the energy density, and to act as an electrode spacer in order to eliminate an inert separator used in prior art.

One polymer electrolyte system which has received considerable interest particularly in electrochemical capacitor applications, is polyvinyl alcohol (PVA), having dispersed therein a proton conducting electrolyte active species such as $H_2SO_4$ or $H_3PO_4$. Unfortunately, the $PVA/H_3PO_4$ electrolytes developed heretofore are not completely stable at elevated temperatures. The mechanical strength of thin films of PVA based polymer electrolytes also needs further improvement for eliminating shorts during the assembly process. Further, the frequency response of certain polymer electrolyte based electrochemical capacitor devices is relatively narrow in comparison to dielectric capacitors. This performance differential may be partially improved by developing polymer electrolytes which have higher ionic conductivity.

Accordingly, there exists a need to provide novel electrochemical capacitor devices free of limitations inherent in the prior art. Such a device should be characterized by a polymer electrolyte system in which the polymeric support structure or matrix thereof is stable at higher temperatures, possesses a relatively wide frequency response, and has relatively high ionic conductivity, approaching that of an conventional liquid electrolyte. Moreover, fabrication of such an electrolyte layer should be simple, inexpensive and readily repeatable.

DETAILED DESCRIPTION OF THE PREFERRED EMBODIMENT

Figure 1:
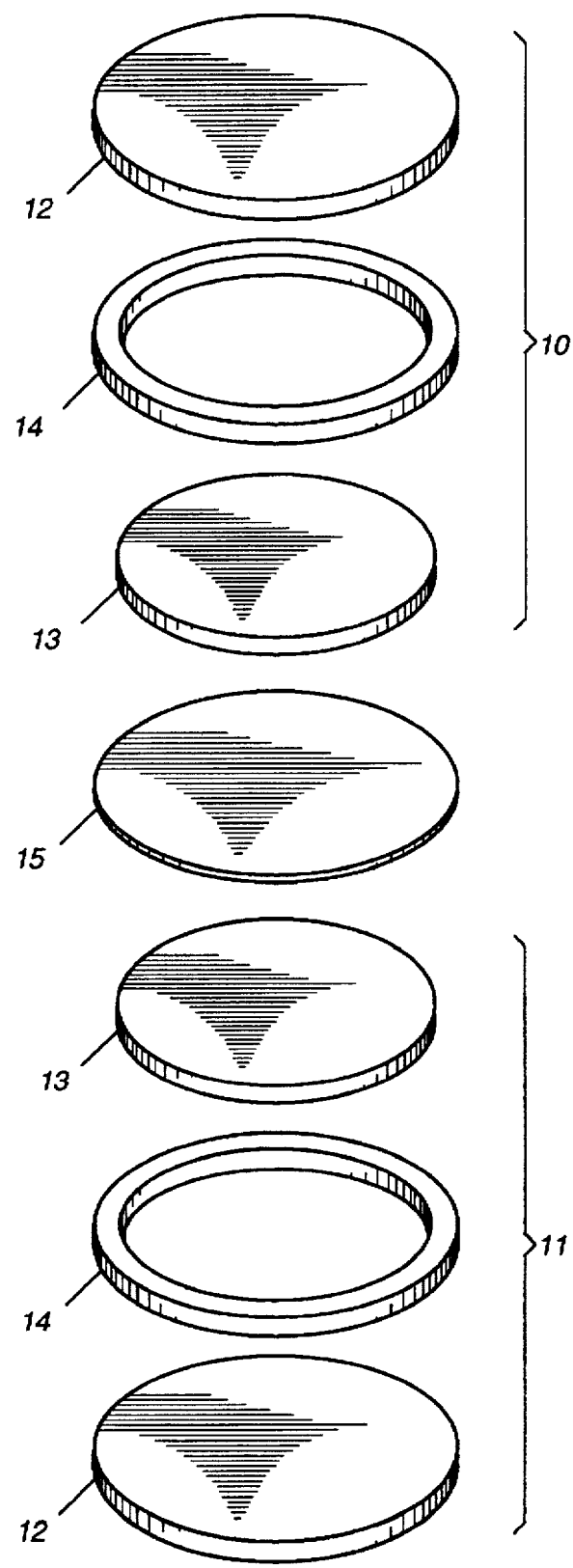
FIG. 1 is a schematic representation of an electrochemical charge storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an energy storage device such as an electrochemical charge storage device fabricated from a pair of electrode assemblies 10 and 11, which may be the anode and the cathode of the device. The electrochemical charge storage device may be either an electrochemical capacitor or an electrochemical battery cell. The electrochemical capacitor is preferably an electrochemical capacitor characterized by an oxidation/reduction charge storage mechanism. Each electrode assembly 10 and 11 includes an electrode 13 which electrodes may either be fabricated from the same or different materials. In the instance in which the electrodes are fabricated of the same material, they are referred to as "symmetric electrodes". Conversely, if they are made from different materials, they are referred to as "asymmetric electrodes". Regardless of whether or not the electrodes are asymmetric or symmetric, they are each made from one or more materials selected from the group consisting of ruthenium, iridium, platinum, cobalt, tungsten, vanadium, iron, nickel, halfnium, molybdenum, silver, zinc, lead, manganese, alloys thereof, nitrides thereof, carbides thereof, sulfides thereof, oxides thereof, and combinations thereof. Alternatively, said electrodes may be fabricated of conducting polymers.

Each electrode assembly may further include a current collector 12 which is electrically conducting. The current collector 12 is preferably chemically inert in the polymer electrolyte system 15 described hereinbelow. A housing or gasket 14 may be employed to house the electrode and the electrolyte, but is optional. The electrolyte system 15 is sandwiched between the electrodes and is in the form of a film, such as a polymer, which may also serve as a separator between the two electrodes. This structure thus affords free and unobstructed movement to the ions in the electrolyte. The combination electrolyte/separator prevents contact between the opposing electrodes since such a condition would result in a short circuit and malfunction of the electrochemical cell.

Figure 2:
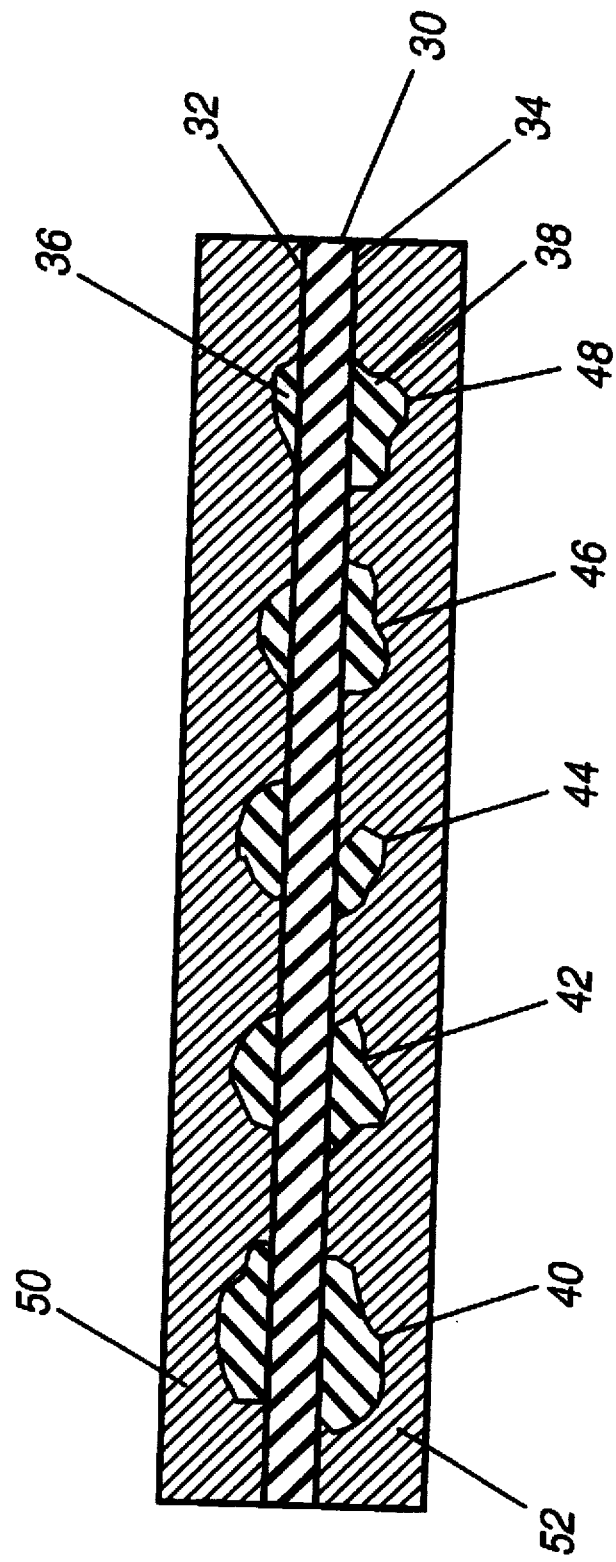
FIG. 2 is a schematic representation of an electrolyte system in accordance with the instant invention.

Referring now to FIG. 2, the polymer electrolyte system is a multilayered polymer system which is disposed between and in contact with both the electrode assemblies. The polymer electrolyte system includes a first polymeric layer 30, having first and second major surfaces 32, 34. The first layer may be fabricated, for example, by casting, and is provided to enhance conductivity, temperature tolerance, and to improve mechanical strength. Disposed on at least one, and prefereably both surfaces is a layer of a different, second polymeric material 36, 38 respectively. The second polymeric material is preferably more formable (or less viscous) than the first polymer layer so that it can easily fill pores (such as 40, 42, 44, 46, and 48) in the adjacent electrodes 50 and 52. The second polymeric material may also provide an adhesive property so as to "glue" the electrolyte system together, and to the adjacent electrodes. The polymer electrolyte comprises a polymer support structure or matrix which has an electrolyte active species disposed or dispersed therein. The polymeric support structure or matrix preferably is fabricated as a multilayered polymeric support structure including a first layer of a polymeric material having first and second major surfaces, and a layer of a second polymeric material disposed on at least one of said first and second major surfaces. An electrolyte active species is dispersed in said polymeric support structure.

The polymeric support structure may further include a layer of a second polymeric material disposed on both the first and the second major surfaces of said first polymeric material. In this instance, the layers of second polymeric material may be either the same or different. The first polymeric material may be selected from any of a number of polymers, and is preferebly selected from the group of polybenzimidazoles ("PBI"), Nafion, cross-linked poly vinyl alcohol, polyethylene glycol, acrylated epoxy, acrylated urethane polyethyleneimine (PEI), polyethylene oxide (PEO), poly(acrylamide) -acrylic acid (PAAM-PAA), and poly(2-hydroxyethyl methacrylate), poly(vinyl pyridine) (P2VP), poly(vinyl pyrrolidone) (PVP), poly(vinyl fluoride) (PVF), polethyleneimine (PEI), polyacrylic acid, poly (ethylene glycol), and combinations thereof.

PBI type electrolytes are described in commonly assigned, copending application Ser. No. 08/629,174 entitled ELECTROCHEMICAL CELL HAVING A POLYMER ELECTROLYTE, dated Apr. 8, 1996, in the names of Li, et al, the disclosure of which is incorporated by reference. Similarly, the second polymeric material may be any one of a number of polymers, and is prefereably selected from the group of poly vinyl alcohol ("PVA"), polyethylene oxide (PEO), polyacrylamide (PAAM), poly(vinyl pyridine) (P2VP), poly(vinyl pyrrolidone) (PVP), poly(vinyl fluoride) (PVF), polethyleneimine (PEI), polyacrylic acid, poly (ethylene glycol), poly(vinyl methylethyl ether), phenol formaldehyde, and combinations thereof. In one preferred embodiment, the first polymeric material is poly{2,2'-m-(phenylene)-5,5'-bibenzimidazole}, and the second polymeric material is poly vinyl alcohol.

Dispersed within the polymer support structure is a proton conducting electrolyte active species. The proton conducting electrolyte active species may be selected from the group of materials consisting of $H_3PO_4$ (phosphoric acid), $H_2SO_4$ (sulfuric acid), HCl (hydrochloric acid), $HNO_3$, and combinations thereof. Alternatively, the electrolyte active species may be a metal hydroxide such as KOH, NaOH, LiOH, CeOH, and combinations thereof. In one preferred embodiment, the polymer electrolyte is made from a first polymer layer fabricated of poly{2, 2'-m-(phenylene)-5,5'-bibenzimidazole}, a second polymer layer fabricated of poly vinyl alcohol, and phosphoric acid as the electrolyte species.

EXAMPLE

Example I

An experimental device was fabricated using a multilayered electrolyte system in order to determine how such an electrolyte system performed as compared to the prior art. Two $RuO_2$/Ti electrodes were prepared in a method well known in the art. A layer of polyvinyl alcohol (PVA) having $H_3PO_4$ dispersed therein was coated on the electrodes to a thickness of approximately 0.5 mil. The PVA-$H_3PO_4$ solution was approximately 5 wt % PVA (in water) and 1:1 ratio of PVA to $H_3PO_4$. Since this solution was not very viscous, it easily flowed into the pores of the electrodes. A layer of PBI-$H_3PO_4$ electrolyte was immediately sandwiched between the coated electrode layers, and the entire structure was pressed under 500 psi, at 50 degrees C. for approximately 5 minutes.

The resulting device was then tested, and compared to a conventional device, in which the electrolyte system contained only PBI-$H_3PO_4$. The specific capacitance of the PVA-PBI system was 378 milliFarad per square centimeter ($mF/cm^2$), as compared with 215 $mF/cm^2$ for the conventional device. The equivalent series resistance (ESR) for the PVA-PBI system was measured at 110 m$\Omega$, as compared to 245 m$\Omega$ for the conventional device. Again, device performance far exceeded the prior art.

Figure 3:
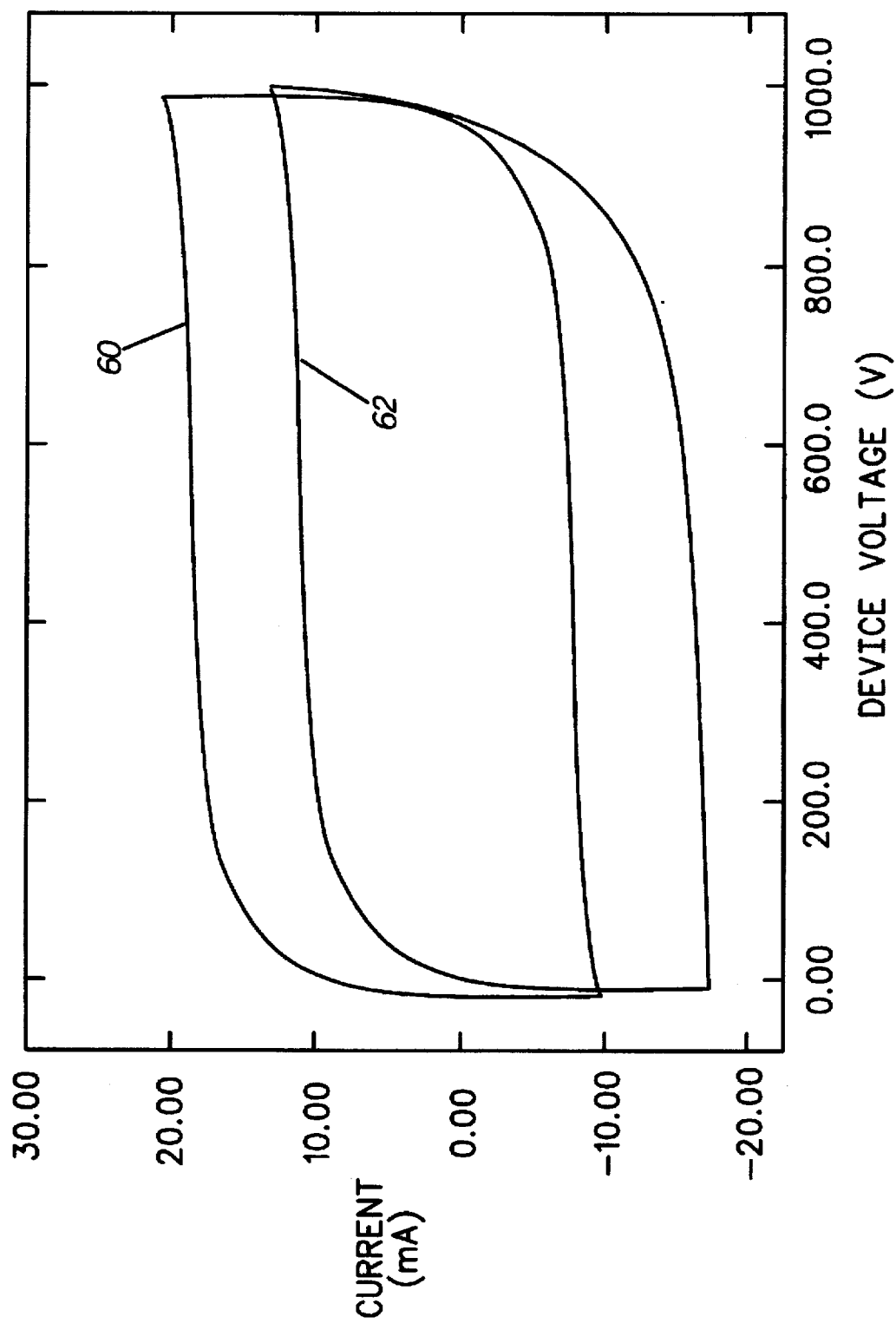
FIG. 3 is a CV for a device using an electrolyte system in accordance with the instant invention, as compared to a device using an electrolyte system of the prior art.

Referring now to FIG. 3, there is illustrated therein a cyclic voltammogram ("CCV") for the device of this example (line 60) as compared to a device of the prior art (line 62). As may be appreciated from a perusal of the CV, the PBI/PVA electrolyte system has much higher charge storage capacity than the PBI alone.

Example II

Single cell devices were assembled using the PVA/H3PO4 electrolyte and the PBI-PVA/H3PO4 multi-layer polymer electrolyte to compare the mechanical integrity of the devices. The RuO2 electrodes were produced in the same method described in Example 1, and their average capacitance was 100 $mF/cm^2$. After an initial coat of 1:1.5 PVA-H3PO4, the cells were dried. Then, the PVA-H3PO4 cells were coated with 3 layers of 1:1 PVA-H3PO4. Alternatively, the PBI cells were coated with one layer of 1:1.5 PVA-H3PO4 and then layered with a 0.002 in. thick film of PBI-H3PO4; these cells were laminated in a press at 93–120 deg C. for two hours at pressures ranging 2500 to 4000 psi.

Figure 4:
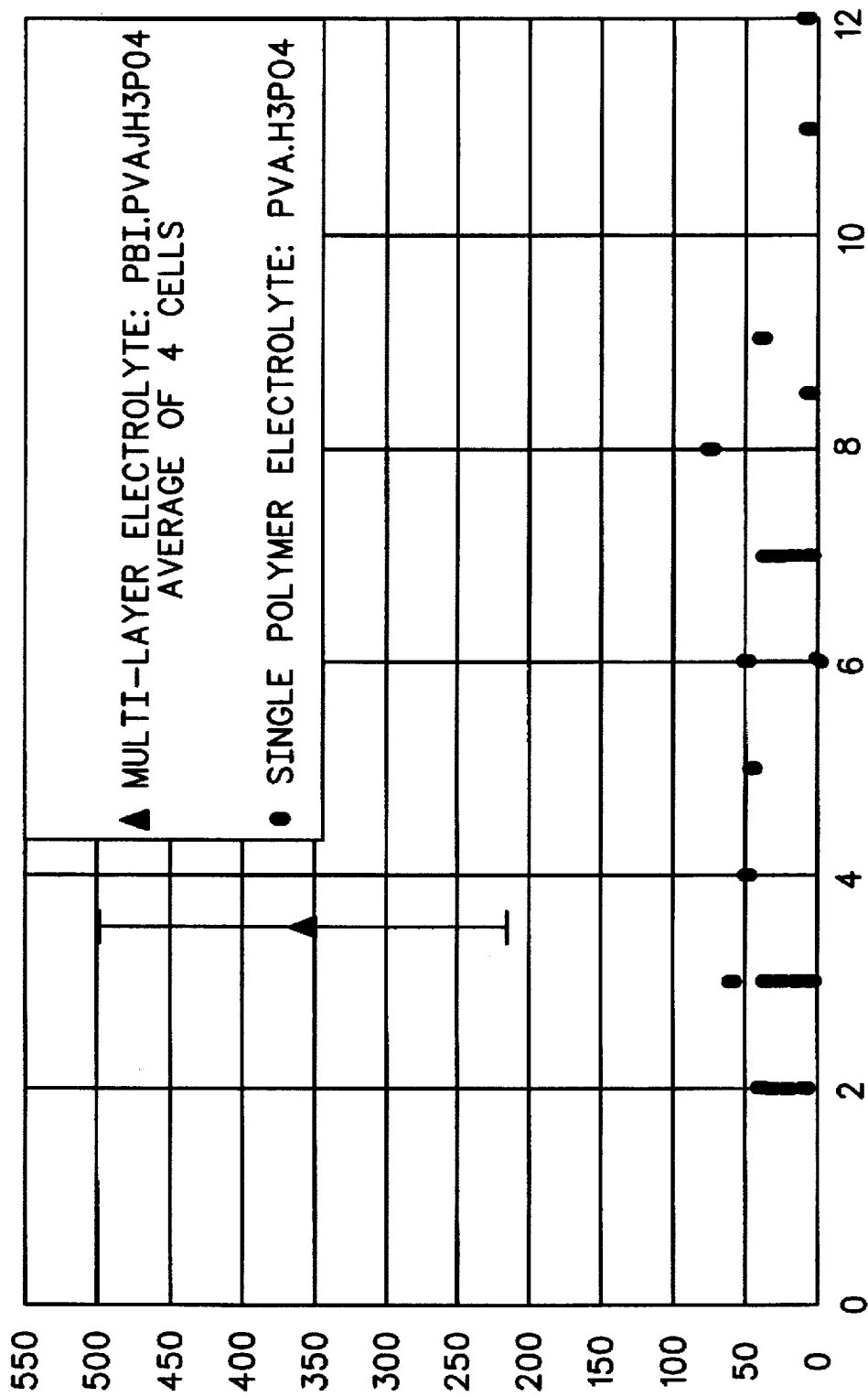
FIG. 4 is a chart plotting interface strength versus electrolyte thickness for an electrolyte system in accordance with the instant invention.

FIG. 4 shows that the average interface strength of the PBI-PVA multi-layer polymer devices was about 360 psi compared to an average of about 50 psi for the PVA devices. (Processing conditions affect the interface strength of both electrolyte combinations; the variation of the PBI/PVA strength arises from differences in the lamination conditions)

The results indicate that the PBI film is inherently stronger when used with the PVA to increase adhesion. Without use of the PVA film laid directly on the electrode, the PBI film failed to adhere. During the lamination and assembly, the PVA electrolyte deforms and fills the pores of the electrodes whereas the rigid PBI film does not deform. The PVA fills the electrode pores and acts as a glue for the PBI film; the effective surface area is higher with the PVA filler and the ESR is lowered and the mechanical strength increased. As a result, the interface strength of the PBI-PVA multipolymer devices was four to ten times higher than that of the PVA only devices.

Example III

An electrochemical cell was assembled using Co—Ni alloy as cathode, Zn as anode and a polymer gel electrolyte.

Figure 5:
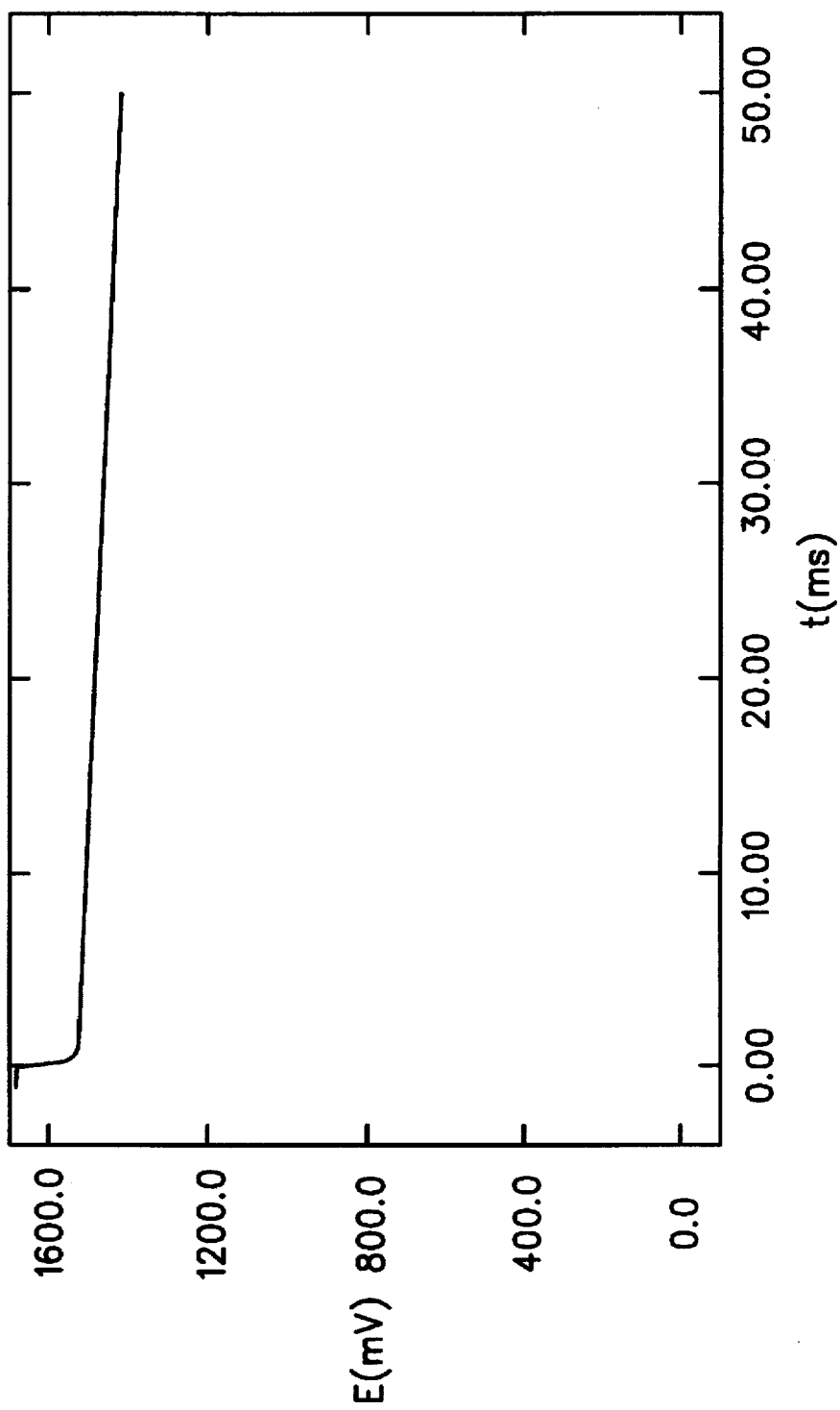
FIG. 5 is a constant current discharge curve for a cell using an electrolyte system in accordance with the instant invention.

The polymer gel electrolyte contained poly(vinyl alcohol), polyacrylamide (PAAM), water and KOH. The PVA-KOH gel casting solution had a low viscosity but dried quite quickly; it can be cast on the electrode surface to increase the utilization of the electrode, but its adhesion to electrodes was not as good as the PVA/H3PO4. The PAAM-KOH gel is relatively tacky, it can be used to bind the electrodes together. In the present example, a wet PVA-KOH solution was initially coated on the activated Co—Ni electrode and Zn. A second layer of PAAM-KOH casting solution was applied to one of the electrodes followed by cell assembly. The cell assembled this way worked quite well. FIG. 5 shows a discharge curve of the cell. It can be discharged at ca. 120 mA/cm2. The discharge curve shows a low ESR drop.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrolyte system comprising:

a multi-layered polymeric support structure comprising a first layer of a polymeric material comprising a polybenzimidazole, and having first and second major surfaces, and a layer of a second polymeric material disposed on at least one of said first and second major surfaces; and an electrolyte active species dispersed in said polymeric support structure.

2. An electrolyte system as in claim 1, wherein said polymeric support structure comprises a layer of said second polymeric material disposed on both the first and the second major surfaces of said first polymeric material.

3. An electrolyte system as in claim 2, wherein the layers of second polymeric material are the same.

4. An electrolyte system as in claim 2, wherein the layers of second polymeric material are different.

5. An electrolyte system as in claim 1, wherein said second polymeric material is selected from the group consisting of poly vinyl alcohol, polyethylene oxide (PEO), polyacrylamide (PAAM), poly(vinyl pyridine) (P2VP), poly(vinyl pyrrolidone) (PVP), poly(vinyl fluoride) (PVF), polethyleneimine (PEI), polyacrylic acid, poly(ethylene glycol), poly(vinyl methylethyl ether), phenol formaldehyde, and combinations thereof.

6. An electrolyte system as in claim 1, wherein said first polymeric material is poly{2,2'-m-(phenylene)-5,5'-bibenzimidazole}, and said second polymeric material is poly vinyl alcohol.

7. An electrolyte system as in claim 1, wherein said electrolyte active species is a proton conducting electrolyte species.

8. An electrolyte system as in claim 7, wherein said proton conducting electrolyte species is selected from the group consisting of $H_2SO_4$, $H_3PO_4$, HCl, $HNO_3$, and combinations thereof.

9. An electrolyte system as in claim 1, wherein said electrolyte active species is a metal hydroxide.

10. An electrolyte system as in claim 9, wherein said metal hydroxide electrolyte active species is selected from the group consisting of KOH, NaOH, LiOH, CeOH, and combinations thereof.

11. A polymer electrolyte system comprising: a polymeric support structure comprising a first polymeric material selected from the group consisting of polybenzimidazoles, cross-linked poly vinyl alcohol, acrylated epoxy, acrylated urethane, polyethyleneimine (PEI), poly(acrylamide)-acrylic acid (PAAM-PAA), poly(2-hydroxyethyl methacrylate), poly(vinyl pyridine) (P2VP), poly(vinyl pyrrolidone) (PVP), poly(vinyl fluoride) (PVF), polethyleneimine (PEI), polyacrylic acid, and combinations thereof, a second polymeric material disposed on at least one major surface of said first polymeric material, said second polymeric material selected from the group consisting of poly vinyl alcohol, polyacrylamide (PAAM), poly(vinyl pyridine) (P2VP), poly(vinyl pyrrolidone) (PVP), poly(vinyl fluoride) (PVF), polethyleneimine (PEI), polyacrylic acid, poly(vinyl methylethyl ether), phenol formaldehyde, and combinations thereof; and an electrolyte active species dispersed in said polymeric support structure, said electrolyte active species being selected from the group consisting of metal hydroxides, and proton conducting species.

12. An electrolyte system as in claim 11, wherein said polymeric support structure comprises a layer of said second polymeric material disposed on more than one major surface of said first polymeric material.

13. An electrolyte system as in claim 12, wherein the layers of second polymeric material are the same.

14. An electrolyte system as in claim 12, wherein the layers of second polymeric material are different.

15. An electrolyte system as in claim 11, wherein said first polymeric material is poly{2,2'-m-(phenylene)-5,5'-bibenzimidazole}, and said second polymeric material is poly vinyl alcohol.

16. An electrolyte system as in claim 11, wherein said proton conducting electrolyte actives species is selected from the group of consisting $H_2SO_4$, $H_3PO_4$, HCl, $HNO_3$, and combinations thereof.

17. An electrolyte system as in claim 11, wherein said metal hydroxide electrolyte active species is selected from the group consisting of KOH, NaOH, LiOH, CeOH, and combinations thereof.

18. An electrochemical energy storage device comprising:

first and second electrodes, at least one of said electrodes being fabricated of materials selected from the group consisting of Ru, Co, W, V, Fe, Mo, Ni, Ag, Zn, Pb, Hf, Mn alloys thereof, oxides thereof, carbides thereof, nitrides thereof, sulfides thereof, and combinations thereof; and a polymer electrolyte system disposed between and in contact with said electrodes, said polymer electrolyte system comprising a multi-layered polymeric support structure including a first layer of a polymeric material being fabricated of polybenzimidizole, and having first and second major surfaces, and a layer of a second polymeric material disposed on at least one of said first and second major surfaces and an electrolyte active species dispersed in said polymeric support structure.

19. An electrochemical energy storage device as in claim 18, wherein said first and second electrodes are symmetric.

20. An electrochemical energy storage device as in claim 18, wherein said first and second electrodes are asymmetric.

21. An electrochemical energy storage device as in claim 18, wherein said electrolyte active species is a proton conducting electrolyte species.

22. An electrochemical energy storage device as in claim 21, wherein said proton conducting electrolyte species is selected from the group consisting of $H_2SO_4$, $H_3PO_4$, HCl, $HNO_3$, and combinations thereof.

23. An electrochemical energy storage device as in claim 18, wherein said electrolyte active species is a metal hydroxide.

24. An electrochemical energy storage device as in claim 23, wherein said metal hydroxide electrolyte active species is selected from the group consisting of KOH, NaOH, LiOH, CeOH, and combinations thereof.

25. An electrochemical energy storage device as in claim 18, wherein said device is a battery.

26. An electrochemical energy storage device as in claim 18, wherein said device is a capacitor.

27. An electrochemical energy storage device as in claim 26, wherein said capacitor stores charge via an oxidation/reduction charge storage mechanism.

28. An electrochemical energy storage device as in claim 18, wherein said polymeric support structure comprises a layer of said second polymeric material disposed on both the first and the second major surfaces of said first polymeric material.

29. An electrochemical energy storage device as in claim 28, wherein the layers of second polymeric material are the same.

30. An electrochemical energy storage device as in claim 28 wherein the layers of second polymeric material are different.

31. An electrochemical energy storage device as in claim 18, wherein said second polymeric material is selected from the group consisting of poly vinyl alcohol, polyacrylamide (PAAM), poly(vinyl pyridine) (P2VP), poly(vinyl pyrrolidone) (PVP), poly(vinyl fluoride) (PVF), polethyleneimine (PEI), polyacrylic acid, poly(vinyl methylethyl ether), phenol formaldehyde, and combinations thereof.

32. An electrochemical energy storage device as in claim 18, wherein said first polymeric material is poly{2,2'-m-(phenylene)-5,5'-bibenzimidazole}, and said second polymeric material is poly vinyl alcohol.

33. A electrochemical energy storage device comprising:
    first and second electrodes; and
    a multilayered polymeric support structure comprising a first layer of a polymeric material being fabricated of a polybenzimidazole, and having first and second major surfaces, and a layer of a second polymeric material disposed on at least one of said first and second major surfaces, and an electrolyte active species disposed in said polymeric support structure.

34. An electrochemical energy storage device as in claim 33, wherein said first and second electrodes are fabricated of materials selected from the group consisting of Ru, Ir, Co, W, V, Fe, Mo, Ni, Ag, Zn, Pb, Hf, Mn alloys thereof, oxides thereof, carbides thereof, nitrides thereof, sulfides thereof, and combinations thereof.

35. An electrochemical energy storage device as in claim 34, wherein said first and second electrodes are symmetric.

36. An electrochemical energy storage device as in claim 34, wherein said first and second electrodes are asymmetric.

37. An electrochemical energy storage device as in claim 33, wherein said device is a capacitor.

38. An electrochemical energy storage device as in claim 37, wherein said capacitor stores charge via an oxidation/reduction charge storage mechanism.

39. An electrochemical energy storage device as in claim 33, wherein said polymeric support structure comprises a layer of said second polymeric material disposed on both the first and the second major surfaces of said first polymeric material.

40. An electrochemical energy storage device as in claim 39, wherein the layers of second polymeric material are the same.

41. An electrochemical energy storage device as in claim 39 wherein the layers of second polymeric material are different.

42. An electrochemical energy storage device as in claim 33, wherein said second polymeric material is selected from the group consisting of poly vinyl alcohol, polyacrylamide (PAAM), poly(vinyl pyridine) (P2VP), poly(vinyl pyrrolidone) (PVP), poly(vinyl fluoride) (PVF), polethyleneimine (PEI), polyacrylic acid, poly(vinyl methylethyl ether), phenol formaldehyde, and combinations thereof.

43. An electrochemical energy storage device as in claim 33, wherein said first polymeric material is poly{2,2'-m-(phenylene)-5,5'-bibenzimidazole}, and said second polymeric material is poly vinyl alcohol.

* * * * *